United States Patent [19]

Smith et al.

[11] Patent Number: 4,954,051

[45] Date of Patent: Sep. 4, 1990

[54] AIR SPRING SEAT AND AIR PUMP

[75] Inventors: Rod Smith, Seymour, Tenn.; Timothy L. Oliphant, Federal Way; Charles E. Stephens, Kent, both of Wash.

[73] Assignee: National Seating Company, Vonore, Tenn.

[21] Appl. No.: 282,515

[22] Filed: Jan. 12, 1989

Related U.S. Application Data

[62] Division of Ser. No. 103,934, Oct. 2, 1987, Pat. No. 4,809,944.

[51] Int. Cl.$^5$ .............................................. F04B 49/00
[52] U.S. Cl. .................................... 417/305; 417/553; 248/631
[58] Field of Search ........... 417/305, 307, 553, 555 R, 417/440, 443, 520, 311, 435, 490, 230; 248/631; 251/319

[56] References Cited

U.S. PATENT DOCUMENTS

| | | | |
|---|---|---|---|
| 1,988,164 | 1/1935 | Cummins | 417/305 |
| 2,245,909 | 6/1941 | Enfiajian | 5/451 |
| 2,366,080 | 12/1944 | Wingate | 417/553 |
| 2,557,880 | 6/1951 | Lynn | 222/380 |
| 2,575,764 | 11/1951 | Morner | 428/72 |
| 2,731,652 | 1/1956 | Bishop | 5/455 |
| 2,960,942 | 11/1960 | Pier et al. | 410/119 |
| 3,468,311 | 9/1969 | Gallagher | 604/370 |
| 3,583,008 | 6/1971 | Edwards | 5/454 |
| 3,752,604 | 8/1973 | Dorn | 417/553 |
| 3,879,776 | 4/1975 | Solen | 5/453 |
| 3,913,901 | 10/1975 | Molders | 248/631 |
| 4,279,044 | 7/1981 | Douglas | 5/453 |
| 4,422,194 | 12/1983 | Viesturs et al. | 5/451 |
| 4,428,478 | 1/1984 | Haffman | 417/307 |
| 4,472,112 | 9/1984 | Unger | 417/311 |
| 4,488,322 | 12/1984 | Hunt et al. | 5/453 |
| 4,662,012 | 5/1987 | Torbet | 5/453 |

FOREIGN PATENT DOCUMENTS 0218301 4/1987 European Pat. Off. .

Primary Examiner—Leonard E. Smith
Assistant Examiner—Robert N. Blackmon
Attorney, Agent, or Firm—Ostrolenk, Faber, Gerb & Soffen

[57] ABSTRACT

An air spring seat principally for buses, trucks, boats or other vehicles includes a manual air pump for inflating and deflating the air spring. The manual air pump includes a piston having a rearward air intake stroke, a forward compression stroke to deliver pressurized air through a check valve delivery and venting system to the air spring, a pressure stabilized at rest position at the end of the compression stroke and a forward venting stroke from the at rest position mechanically to release air from the air spring through the check valve delivery and venting system. A floating seal carried by the piston provides a fluid tight seal between the piston and pump body during the piston compression stroke but permits air to move from the intake side of the piston to the compression side of the piston during the piston intake stroke. The piston movements are all controlled by a manual lever handle readily accessible to the seat occupant. The lever handle is nested adjacent the seat cushion in the at rest position of the piston, is pulled upwardly from the at rest position to effect the piston intake stroke, is pushed downwardly to the at rest position to effect the piston compression stroke, and is pushed further downwardly from the at rest position to effect the piston venting stroke. The manual air pump includes a check valve relief system to release pressurized air from the pump housing during the piston compression stroke when the air spring pressure equals a preselected maximum operating pressure.

9 Claims, 3 Drawing Sheets

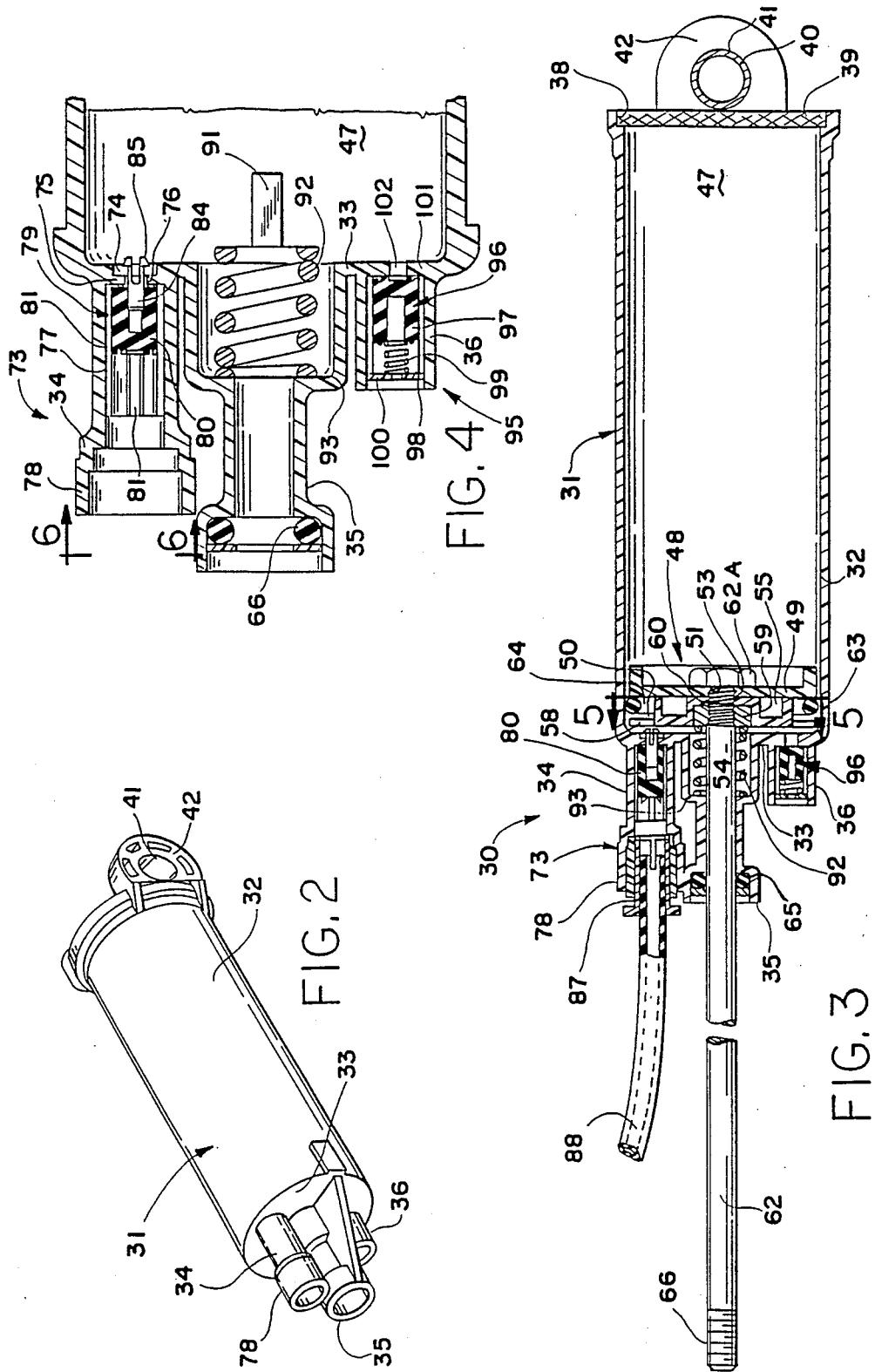

AIR SPRING SEAT AND AIR PUMP

This application is a division of Ser. No. 07/103,934 filed 10/2/87 now U.S. Pat. No. 4,809,944.

FIELD OF THE INVENTION

The present invention generally relates to an air spring seat and specifically relates to an air spring seat employing a manual air pump having a readily accessible lever handle to control the inflation and deflation functions.

BACKGROUND OF THE INVENTION

Air spring seats have long been utilized as the driver's seat in trucks and buses. These air spring seats absorb shock and vibratory loads encountered in vehicle operation better than more conventional coil spring support seats. An example of a vehicle air spring seat is disclosed in Dome U.S. Pat. No. 3,298,654, assigned to a predecessor in interest to the assignee of the present invention.

Such air spring seats have been used in vehicles having a compressed air system to provide selective inflation and deflation of the air spring. These air spring seats were normally installed as original equipment in the vehicle as manufactured. To retrofit an air spring seat into a vehicle with system air, special electrical and air system modifications have to be made to the vehicle, if possible, to accomodate the necessary seat connections.

A manual pumping system for a seat employing a fluid spring system has been suggested in the art. Moore U.S. Pat. No. 3,090,647 discloses a vehicle seat employing an air operated hydraulic spring positioned between the seat base and seat frame. The air to operate the hydraulic spring is provided by a manually operated air pump mounted on and to the side of the seat frame. The Moore patent does not teach how the hydraulic spring is lowered or what happens if the air volume in the hydraulic spring is overpressurized. Moreover, the spherical knob handle for the manual air pump in Moore does not control all functions of the pump.

SUMMARY OF THE INVENTION

The principal object of the present invention is to provide an easily installed and easily operated air spring seat employing a manual air pump. This seat can readily be retrofit into vehicles or can be installed in vehicles without system air and/or with limited available space.

Another object of the present invention is to provide an air spring vehicle seat having a readily accessible handle controlling all functions of the manually operated air spring. When at rest, the handle is in a nested position at the side of the seat. The handle is pivotally connected to the seat frame and provides a lever action for controlling pump functions. The handle is raised from the at rest position for air intake, is lowered from its raised position for air compression and is further lowered from the at rest position for air spring venting.

It is still another object to provide a manually operated air pump for vehicle seats or the like having a pressurized air delivery and venting system and a pressure relief system. The pressurized air delivery and venting system is controlled by piston movements effected by the handle for the manually operated air pump. Both the air pressure delivery and venting system and the pressure relief system employ check valves designed to open and close under different operating conditions and by different structural or functional means.

It is yet another object of the present invention to provide a manually operated air pump for vehicle seats or the like having a piston with special sealing and operating characteristics. The piston includes a floating seal designed to provide a sealed sliding fit with the cylinder bore during the compression stroke but providing a sliding unsealed fit during the air intake stroke. The piston at the end of its compression stroke is in a pressure equalized at rest position provided by a groove in the cylinder bore wall communicating with opposite sides of the piston seal. From the at rest position, the piston can be further advanced mechanically to open the air delivery and venting system. The venting stroke requires additional handle force due to a spring being engaged and compressed only during this venting stroke.

These and other objects and advantages of the present invention will become apparent as the following description proceeds.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

DESCRIPTION OF THE DRAWINGS

FIG. 2 is a perspective view of the air pump body of the present invention;

FIG. 3 is a longitudnal cross section of the manually operated air pump of the present invention, with the piston being shown in its pressure equalized at rest position;

FIG. 4 is an enlarged cross section of one end of the pump body showing the details of the air delivery and venting system and the pressure relief system;

DETAILED DESCRIPTION OF THE INVENTION

Figure 1:
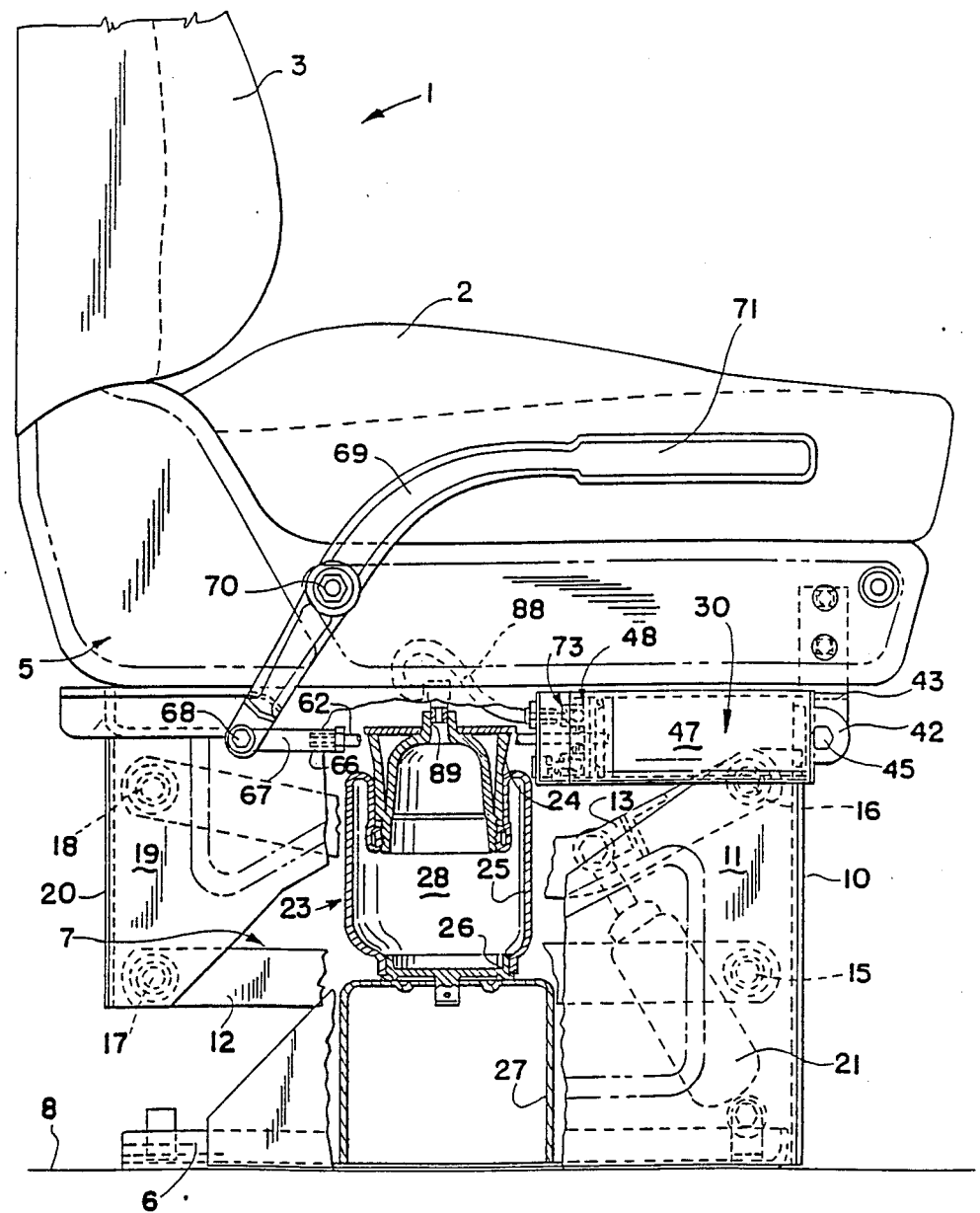
FIG. 1 is a side elevation partially in section of a vehicle seat employing the manually operated air pump and air spring suspension of the present invention.

Turning now in more detail to the drawings and initially to FIG. 1, a vehicle seat indicated generally at 1 includes a seat cushion 2 and a seat back 3. The air spring seat 1 is principally designed for use in vehicles. For example, the air spring seat 1 could be used as a driver's seat in buses, planes, trucks, vans, mini-vans, four wheel drive vehicles, boats and the like. In addition however, air spring seats are also being used in other environments including, for example, office chairs, secretarial chairs and leisure chairs. The term "air spring seat" as used herein generically encompasses all uses and applications for which the seat of the present invention may be utilized.

The seat cushion 2 and seat back 3 are mounted on a seat frame, indicated generally at 5. The seat frame 5 is supported from a seat base 6 by pivotal suspension arms, indicated generally at 7. The seat base 6 can be secured to floor 8.

The seat base 6 includes an upstanding, generally U-shape pivot support 10 having side plates 11. The pivotal support arms 7 include a lower suspension arm 12 and an upper suspension arm 13 on each side of the vehicle seat 1. The lower and upper suspension arms 12 and 13 are respectively pivotally connected as indicated at 15 and 16 to the side plate 11 on each side of the seat. The other ends of each pair of lower and upper suspension arms 12 and 13 are respectively pivotally connected as indicated at 17 and 18 to the side plates 19 on downwardly extending, generally U-shape support 20. A shock absorber 21 may be installed between base frame 6 and suspension arm 13.

The support 20 is secured to and extends downwardly from seat frame 5. The seat frame 5 includes a dished seat pan accomodating air hoses and the like for an air spring, indicated generally at 23.

Air spring 23 includes piston 24, rolling lobe sleeve 25 and plug 26. The rolling lobe, flexible sleeve 25 extends between and is connected at its respective opposite ends to piston 24 and plug 26. The plug 26 is mounted on a base 27 secured to seat base 6. The piston 24 is mounted on and extends downwardly from the seat frame 5. The air spring 23 thus extends between the seat base 6 and seat frame 5.

The piston 24, rolling lobe flexible sleeve 25 and plug 26 cooperatively define air spring compartment 28. Compressed air may be added to or withdrawn from closed air compartment 28 respectively to inflate or deflate the air spring 23. The compressed air is added to or withdrawn from the air spring 23 by a manually operated air pump indicated generally at 30.

As best shown in FIGS. 2 through 4, the manually operated air pump 30 includes an injection molded plastic body, indicated generally at 31. The body 31 includes a generally cylindrical section 32 and a first end section 33 having three integrally formed bosses thereon, identified as 34 through 36, respectively. The other or second end of the injection molded body 34 is open and formed with a seat 38. A porous filter 39 is received in seat 38 and extends across the second end of pump body 31. This porous filter is preferably a polypropylene screen having a 250 micron mesh size. The porous filter blocks many of the air entrained contaminants from entering the pump body 31.

The porous filter 39 is retained in seat 38 by a steel support tube 40. The steel support tube 40 extends through aligned apertures 41 in a pair of diametrically opposed ears 42 integrally formed on and extending rearwardly from opposite sides of the second end of pump body 31. Support tube 40 bears against the rear surface of filter 39 removably to hold it in place. One end of support tube 40 bears against a bracket 43 secured to and extending downwardly from seat frame 5. Bracket 43 has an aperture therein aligned with the apertures 41 in ears 42, with the bracket aperture having approximately the same diameter as the inner diameter of support tube 40. A shank on mounting bolt 45 is passed through support tube 40 and bracket 43. A nut is threaded onto the end of the bolt shank against bracket 43, with the head of the bolt being drawn against the other end of support tube 40. The support tube and bracket take the compression loading of mounting bolt 45 away from the integrally formed plastic ears. The mounting bolt, support tube and bracket provide a pivotal mounting connection for the second end of the piston body to the seat frame 5.

The cylindrical section 32, first end 33 and porous filter 39 cooperatively define an air chamber 47. A piston indicated generally at 48 is received in air chamber 47 and reciprocally slides along the inner diameter or bore of the cylindrical section 32 of pump body 31.

The piston 48 has a composite structure including molded plastic back up plate 49 and spider plate 50. The outer diameters of back up plate 49 and spider plate 50 are slightly less than the inner diameter of the bore of the cylindrical portion 32 of body 31, thereby to allow the body rectilinearly to guide the piston while still selectively providing an air path as described in more detail hereinafter.

Figure 5:
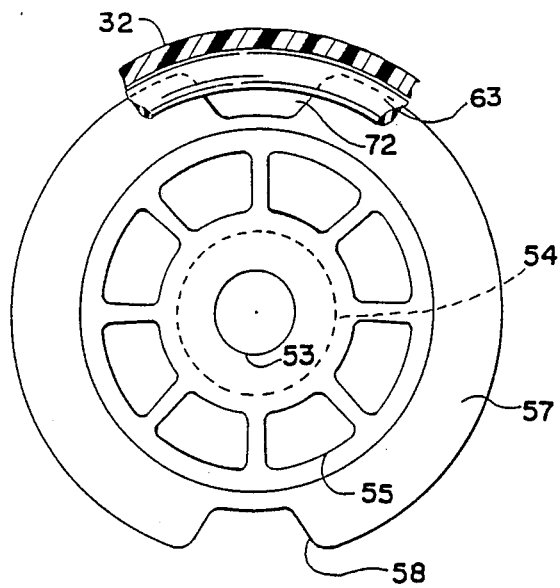
FIG. 5 is a partially fragmented, vertical section taken generally along the plane 5—5 in FIG. 3 showing the spider plate forming the front or leading wall of the piston.

The back up plate 49 is pan shape and has a center aperture 51 extending therethrough. The integrally formed spider plate 50 includes a center aperture 53, central nut recess 54 and a plurality of circumferentially separated, spacing pockets 55. The spider plate 50 further includes a peripheral skirt 57 having two diametrically opposed notches 58 as best shown in FIG. 5. The spider plate 50 forms the front or leading wall of the piston as assembled.

To assemble piston 48, a jam nut 59 is turned onto a threaded end 60 of piston rod 62. The spider plate 50 is then moved into position by passing the threaded end 60 of piston rod 62 through center aperture 53, with nut 59 being received in nut recess 54. An annular O-ring seal 63 is then placed adjacent skirt 57 on spider plate 50, with the O-ring seal 63 having an outer diameter slightly greater than the diameter of the bore of cylindrical section 32. Back up plate 49 is positioned against the back of spider plate 50 by the threaded end 60 of piston rod 62 being received in aperture 51. A cap nut 62A is then turned onto the exposed threaded end 60 of piston rod 62 to hold the composite piston 48 in its assembled relationship. The radially outer wall portion of back up plate 49, the skirt 57 on spider plate 50 and the spacing pockets 55 on spider plate 50 cooperatively define an annular sealing pocket 64. The O-ring seal 63 is captured and retained in sealing pocket 64. The sealing pocket 64 has a longitudnal dimension between back up plate 49 and skirt 57 greater than the diameter of O-ring seal 63, thereby to allow the seal selectively to float therein when the piston is reciprocated, as will be described in more detail below.

To effect this reciprocation, the piston rod 62 extends through the bore of central boss 35. An O-ring seal 65 is retained in the forward enlarged end of boss 35 to provide a fluid tight, sliding seal between piston rod 62 and boss 35. The forward end of piston rod 62 has a threaded section 66 threadedly connected to one end of coupling member 67, as best shown in FIG. 1. The other end of coupling member 67 is pivotally connected at 68 to the lower end of lever handle 69.

The lever handle 69 is pivotally connected at 70 to one side of seat frame 5. The pivotally mounted lever handle 69 is contoured to form a hand grip 71, with the hand grip being in a generally horizontal attitude nested at the side of seat cushion 2 in the at rest position of the piston as shown in FIG. 1. The grip 71 of lever handle 69 is readily accessible to the seat occupant while being generally concealed in nested relationship with the seat cushion. The lever handle 69 is preferably mounted on the inside side of seat 1 in the central console area between the vehicle seats.

When the seat occupant grabs hand grip 71 and raises lever handle 69 in a counterclockwise direction from the position shown in FIG. 1, the piston 48 will move to the right from the at rest position toward the second end of air chamber 47. In this return or air intake stroke of the piston, the O-ring seal 63 is held against skirt 57 of spider plate 50. The notches 58 in skirt 57 have an inner diameter less than the inner diameter of the O-ring seal 63 to form air gaps 72, as best shown in FIG. 5. These air gaps 72 created by notches 58 allow air to pass from the right side of piston 48 to the left side of piston 48 as the piston moves through its return or intake stroke toward the second end of air pump 31. This air is drawn into the left or compression side of the piston by the partial vacuum effect created on the compression side by the return or intake piston stroke.

When the seat occupant pushes lever handle 69 downwardly in a clockwise direction from its elevated position toward the at rest position shown in FIG. 1, the piston 48 is rectilinearly driven to the left through its compression stroke. During the compression stroke, the floating seal 63 is positioned against and is pushed by back up plate 49. The O-ring seal thus is in slightly compressed sealing engagement with both the back up plate 49 and the inner diametrical wall of the bore of body 31. With a tight seal between the piston 48 and cylindrical portion 32, a partial vacuum effect is created to the right of piston 48 to draw air through filter 39 into air chamber 47 during the compression stroke. The air tight seal between piston 48 and cylindrical portion 32 also permits the air to the left of piston 48 to be compressed or pressurized during the compression stroke of the piston. This pressurized air created by the compression stroke of the pump is selectively delivered to the air spring 23 by an air delivery and venting system, indicated generally at 73.

The air delivery and venting system 73 is principally housed in offset boss 34 integrally formed at the first end of pump body 31. As viewed from right to left in FIGS. 3 and 4, boss 34 is injection molded to include annular recess 74, shoulder 75 with inlet orifice 76, main passage 77 and quick disconnect socket 78. A first check valve, indicated generally at 79, controls air flow through the boss 34.

Figure 6:
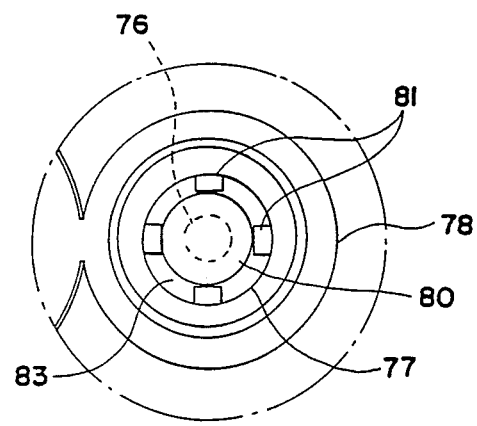
FIG. 6 is an end view taken along plane 6—6 of FIG. 4 showing the details of the air passage in the air delivery and venting system.

First check valve 79 includes a first check valve body member 80, which is received in and selectively reciprocates in main passage 77. As best viewed in FIG. 6, the inner diameter of the main passage 77 has four radially inwardly extending and circumferentially spaced ribs 81. These ribs 81 are in sliding contact with the outer diameter of the first check valve body 80 rectilinearly to guide the same in its selective reciprocal movements. The circumferentially spaced ribs 81 also define air spaces 83 circumferentially therebetween to allow air to pass through main passage 77 when the first check valve 79 is in an open position.

As shown in FIGS. 3 and 4, the first check valve body 80 is in its closed position with the back or right end of the valve body being in engagement with shoulder 75. The first check valve body 80 has a valve stem 84 partially embedded therein and extending through the inlet orifice 76 in shoulder 75. The rear or trailing end of valve stem 84 includes an enlarged fluted head 85 positioned in air chamber 47. The outer diameter of fluted head 85 is greater than the diameter of orifice 76 in shoulder 75.

During the compression stroke, the pressurized air ahead of advancing piston 48 forces the first check valve body 80 to the left and into an open position as viewed in FIGS. 3 and 4. The first check valve body 80 can move to the left until head 85 on valve stem 84 engages shoulder 75 to limit further movement. The pressurized air ahead of advancing piston 48 is then free to pass through recess 74, central orifice 76, air spaces 83 and into quick disconnect socket 78.

A quick disconnect fitting 87 is mounted on the end of hose 88 and is selectively received in quick disconnect socket 78. The other end of hose 88 is connected to inlet fitting 89 in the piston 24 of air spring 23. The pressurized air delivered by the compression stroke of the pump is thus forced through hose 88 into the air compartment 28 of air spring 23. At the completion of the compression stroke, the back pressure from air compartment 28 of air spring 23 urges the first check valve body 80 to the right into closing engagement with shoulder 75. At the completion of the compression stroke, the piston assumes a pressure equalized at rest position.

As best shown in FIG. 3, this at rest position of piston 48 is adjacent to but slightly spaced from the first end 33 of pump body 31. This at rest position is in part established by an elongated groove 91 in the inner diametrical wall of the cylindrical portion 32 of pump body 31. The groove 91 is of sufficient length to extend to both sides of seal 63 when piston 48 is in its at rest position. Air is thus free to move through pressure equalization groove 91 from the left side of piston 48 to the right side of piston 48 as viewed in FIG. 3. Thus, compressed or pressurized air on the left side of piston 48 is allowed to escape past seal 63 by moving through pressure equalization groove 91. As such, pressure is essentially equal on both sides of the piston in its at rest position to have a detent effect on the piston, and the left or leading end of the piston is in engagement with coiled compression spring 92.

Compression spring 92 is received in a well 93 formed in first boss 35. The left or forward end of spring 92 bears against the base of well 93 at the first end of the pump body. The other end of compression spring 92 is flattened and bears against the leading end of piston 48 in its at rest position. Spring 92 extends into air chamber 47 a distance slightly greater than the extension of valve stem 84 into air chamber 47. Spring 92 provides increased resistance to a seat occupant pushing downwardly on lever handle 69. This increased resistance is indicative that the piston is at the end of its compression stroke and has obtained the at rest position. The spring will thus normally preclude inadvertent and undesired overtravel. However, if desired, the lever handle 69 can intentionally be pushed further downwardly against the bias of spring 92 from the at rest position to vent or deflate air spring 23. The pump handle force required to deflate the spring is preferably 10 to 15 pounds greater than the force required for the compression stroke inflating the air spring.

When the handle is pushed in its venting arc, the piston 48 will advance further to the left against the bias of compression spring 92. The leading side of piston 48 will engage and drive enlarged head 85 on valve stem 84 of the first check valve. This valve stem engagement will simultaneously move first check valve body member 80 to the left to open orifice 76. Pressurized air in air compartment 28 of air spring 23 is then free to escape by passing through hose 88, air spaces 83, orifice 76, and pressure equalization recess 91 to atmosphere through filter 39. When the seat occupant determines that sufficient air has been vented from air spring 23, the lever handle 69 can be returned to its at rest position by spring 92, with or without the aid of the seat occupant. The back pressure from air chamber 28 returns first check valve body member 80 to the right into its seated, closed position against shoulder 75 to close orifice 76, thereby to maintain the selected pressure in the air spring.

As a safety feature, the air pump 30 of the present invention is provided with a pressure relief system indicated generally at 95. This pressure relief system is contained within boss 36 at the first end 33 of pump body 31 and includes a second check valve, indicated generally at 96. The second check valve includes a second check valve body 97 having the same configuration as the first check valve body 80 for purposes of interchangeability. The second check valve body 97 is slidably received in and engages four circumferentially spaced ribs 98 in the bore of boss 36. These circumferentially spaced ribs 98 provide air clearances between body 97 and the bore of boss 36. A return spring 99 is interposed between a retaining washer 100 and the left side of second check valve body 97. Return spring 99 urges second check valve body 97 to the right as viewed in FIG. 4 toward its illustrated closed position. In such position, the right hand end of second check valve body 97 is in sealing engagement with a molded shoulder 101 at the first end 33 of valve body 31. The annular shoulder 101 has a relief orifice 102 formed therein along the longitudinal axis of boss 36.

The return spring 99 is selected to have a spring force correlated to the desired maximum operating pressure for air spring 23. When and if the air pressure on the compression side of piston 48 exceeds the selected spring force, the second check valve body 97 is forced to the left against the bias of that spring to open the second check valve. The pressurized air is thus free to escape from the compression side of piston 48 by passing through relief orifice 102 and the air clearances provided between the ribs 98 to atmosphere. When the pressure on the compression side of the piston returns to a lever below the selected maximum operating pressure of air spring 23, return spring 99 urges second check valve body 97 to the right into its normally closed position.

The operation of the air spring seat 1 of the present invention is believed to be apparent from the above description, but a brief operational statement is hereinafter included for purposes of completeness. A person assumes a seated position on seat 1. Depending upon his weight and/or personal preferences, the air spring 23 may not give him the desired feel at the existing level of inflation. Assuming that the air spring 23 is not elevated to the level desired, the seat occupant will begin a series of pumping sequences, each sequence including a piston return or intake stroke and a piston compression stroke. The intake stroke of the piston 48 is effected by raising lever handle 69 from the at rest postion shown in FIG. 1 in a counterclockwise direction. This returns piston 48 from the detented at rest position at the first end of pump body 31 toward the porous filter 39 covering the second end of the pump body. Air in air chamber 47 is drawn or pulled around the piston 48 as it moves to the right as viewed in FIG. 3. This air movement is permitted by the floating seal 63, which is in engagement with skirt 57 during the return stroke. Air can move through the space around back up plate 49 and the gaps 72 created by the diametrically opposed grooves 58 in skirt 57 of spider plate 50.

At the conclusion of the intake or return stroke, the lever handle 69 is pushed downwardly by the seat occupant in a clockwise direction about pivot 70. This moves the piston 48 to the left as viewed in FIG. 3. During advancement of the piston toward the first end of the pump body, the annular O-ring seal 63 is against back up plate 49 of piston 48 to provide a sliding fluid tight seal between the piston and the pump body. This fluid tight seal results in the air to the left of the piston being compressed as the volume on the compression side of the piston decreases. The increasing pressure of the air to the left of piston 48 during its compression stroke forces the first check valve body 80 off its seat on shoulder 75 to allow the pressurized air to be delivered through boss 34 and hose 88 to the air compartment 28 of air spring 23.

At the completion of the compression stroke, the pressure on both sides of the piston is equalized by pressure equalization groove 91, and the leading face of the piston engages compression spring 92. This engagement offers a noticeable increased resistance to the seat occupant and signals the end of the compression stroke. The pressure equalization groove allows the handle 69 naturally to remain in its detented, at rest position at the side of seat 1 when the compression stroke is completed. The intake and compression stroke sequence are repeated as many times as necessary for the seat occupant to attain the level of air spring inflation providing the desired seat feel.

The air spring 23 is designed to have a normal operating range. For example, the pressure in the air spring for a normal weight occupant could be designed for a range between a lowered or deflated position of 20 psi and inflated or raised position of 40 psi. For a normal weight occupant, such as a 160 pound driver, the air spring would reach a lower stop at 25 psi precluding further downward movement of the seat. Similarly, at 35 psi, the air spring would engage an upper stop precluding further elevation of the seat 1. However, the air spring 23 is designed to accomodate pressures from slightly above 0 to over 100 psi. This overall design range (as opposed to the normal operating range) permits the seat to be used by occupants having weights different than the design standard of 160 pounds. Thus, to reach the fully elevated position for a 230 pound seat occupant, the pressure in air chamber 28 of air spring 23 would have to be substantially greater than the normal 35 psi state of inflation. If the seat occupant continues to pump the lever handle 71 after the upper stop has been attained, the pressure relief system will vent the manual pump before a pressure level is achieved greater than the capacity of the air spring itself.

To this end, the return spring 99 may have a spring force of 50 psi. When and if the pressure on the compression side of piston 48 exceeds 50 psi, the second check valve 96 in relief valve system 95 will open to vent the compressed air to atmosphere. This relief valve system provides a safety back up in the unlikely event that the seat occupant attempts to over inflate the air spring.

If the air spring 23 is over inflated for the feel desired by the seat occupant, the air pressure can be vented and the seat lowered by the lever handle 69 being advanced in a clockwise direction downwardly from the at rest position shown in FIG. 1. This further downward movement of the lever handle 69 results in the piston 48 being advanced further to the left against the bias of spring 92. The seat occupant knows the feel of the venting stroke for the piston by the increased resistance encountered in compressing the spring 92. The venting stroke of piston 48 results in the leading side of piston 48 engaging the fluted head 85 on valve stem 84 and driving the same partially into recess 74 at the first end 33 of pump body 31. This mechanical engagement and movement unseats first check valve body 80 to allow air to escape from the air spring 23. The air escape path is through hose 88, boss 34, orifice 76 and pressure equalization groove 91 to atmosphere on the intake side of piston 48. The lever handle 69 is retained in its depressed position until the desired amount of air has been vented from the air spring 23. The lever handle 69 can then be released and the handle will return to its at rest position under the bias of spring 92.

It will be apparent from the foregoing that changes may be made in the details of construction and configuration without department from the spirit of the invention as defined in the following claims.

We claim:

1. A fluid pump comprising a body means having a first end, a second end and a generally cylindrical portion extending therebetween cooperatively to define a fluid chamber; a piston reciprocally movable in the fluid chamber and guided by the cylindrical portion of the body means, the piston having a compression stroke toward the first end and a return stroke toward the second end; a floating seal carried by the piston slidingly to engage the cylindrical portion during the compression stroke to seal the piston to the cylindrical portion and to provide a clearance between the seal and the cylinder during the return stroke; fluid inlet means in the second end to admit fluid to the fluid chamber during the compression stroke of the piston; fluid outlet means in the first end, said outlet means being operative to deliver pressurized fluid from the fluid chamber during the compression stroke of the piston; and pressure equalizing means adjacent the first end of the cylindrical portion operative at the end of the compression stroke to exhaust any pressurized fluid remaining between the piston and first end to stabilize the piston relative to the cylindrical portion in an at rest position.

2. The fluid pump of claim 1 wherein the outlet means includes a delivery and venting passage having a normally closed first check valve therein, the first check valve having a valve stem with an extension that projects into the fluid chamber when the first check valve is closed, said check valve including a movable valve member that unseats during the compression stroke of the piston to open said check valve and returns to its seated position to close said check valve at the completion of the compression stroke, said delivery passage leading to a pressurized fluid container with the back pressure from the fluid container maintaining the movable valve member seated during the at rest and return stroke positions of the piston, and in which the fluid container may be vented selectively by further piston advancement from the at rest position toward the first end to engage and thereby operate the valve stem to unseat the movable valve member selectively to allow pressurized fluid to escape from the fluid container through the delivery passage and pressure equalizing means to atmosphere through the fluid inlet means in the second end of the pump body means.

3. The fluid pump of claim 2 further comprising a spring extending from the first end into the fluid chamber a distance slightly greater than the extension of the valve stem whereby the piston in moving from the at rest position toward said first end will engage the spring before it engages the valve stem and before venting of the fluid container occurs, thereby to require a greater force to be applied to the piston rod to obtain venting of the fluid container.

4. The fluid pump of claim 3 further comprising a piston rod attached to the piston and extending through the first end, with a pulling force on the piston rod resulting in the piston traveling through its compression stroke.

5. The fluid pump of claim 3 wherein the valve stem has an enlarged fluted head at its free end, with the enlarged fluted head engaging a stop after the first valve member has opened to limit further movement of the first valve member.

6. The fluid pump of claim 3 wherein the fluid outlet means includes a relief passage through the first end having a normally closed second valve therein.

7. The fluid pump of claim 6 wherein the second check valve is spring loaded with the spring force of the spring being selected to allow the second check valve to open when the fluid pressure in the fluid chamber between the piston and the first end equals or exceeds the selected maximum operating pressure for the pressurized fluid container during the compression stroke of the piston.

8. The fluid pump of claim 1 wherein the body means comprises a one piece injection molded plastic body integrally forming the cylindrical portion and first end and a porous filter retained in a seat at the second end of cylindrical portion.

9. The fluid pump of claim 8 wherein the pressure equalizing means comprises a groove in the cylindrical portion of the body, the groove extending from adjacent the first end past the piston seal when the piston is in its at rest position.

* * * * *